July 19, 1960   C. VAN DER LELY ET AL   2,945,339
DEVICE FOR LATERALLY DISPLACING GRASS, HAY, OR
OTHER MATERIAL LYING ON THE GROUND
Original Filed Dec. 3, 1953

INVENTORS
Cornelis van der Lely
and Ary van der Lely
BY Mason & Mason
attys

United States Patent Office 2,945,339
Patented July 19, 1960

2,945,339

DEVICE FOR LATERALLY DISPLACING GRASS, HAY, OR OTHER MATERIAL LYING ON THE GROUND

Cornelis van der Lely and Ary van der Lely, Maasland, Netherlands, assignors to C. van der Lely, N.V., Maasland, Netherlands, a Dutch limited company Original application Dec. 3, 1953, Ser. No. 395,958, now Patent No. 2,861,413, dated Nov. 25, 1958. Divided and this application Oct. 13, 1958, Ser. No. 766,744

10 Claims. (Cl. 56—377)

This invention relates to a device for laterally displacing grass, hay or other material lying on the ground comprising a frame having several rake wheels arranged on it in overlapping relation and at an angle to the direction of travel of the frame, the rake wheels being provided with circumferential teeth or similar catching means and rotated by contact with the ground and material lying thereon.

In devices of the above mentioned type of rake wheels, when the raking teeth are rigid and rigidly secured to the wheels, only two teeth, at most, of each rake wheel will simultaneously be in contact with level ground. The obvious result is that the raking width of such rake wheels is comparatively narrow. Even when the raking teeth are made resilient, the working width of the rake wheels remains relatively restricted unless very large rake wheels are employed. But because of weight consideration the practicability of increasing the size of the rake wheel is limited.

An object of this invention is to provide an improved raking device with rake wheels of considerably increased working width.

A further object is to provide rake wheels having a deformable circumference whereby the rake wheels have a flattened part along the surface of the ground.

An additional object is to provide an improved raking device with a simple frame structure which can be used to advantage in combination with a tractor.

With these and other objects which will be understood by those skilled in the art, invention resides in the circumstance, inter alia, that supporting members for the raking teeth on the side turned toward the ground are situated on lines substantially parallel to the ground for an appreciable distance so that a large number of teeth are simultaneously in contact with the ground or material lying thereupon.

This is a division of our application Serial No. 395,958, now Patent 2,861,413, filed December 3, 1953.

The invention will be explained more in detail with reference to the accompanying drawings in which a practical embodiment of the raking device according to the invention has been illustrated by way of example and in which.

Figure 1:
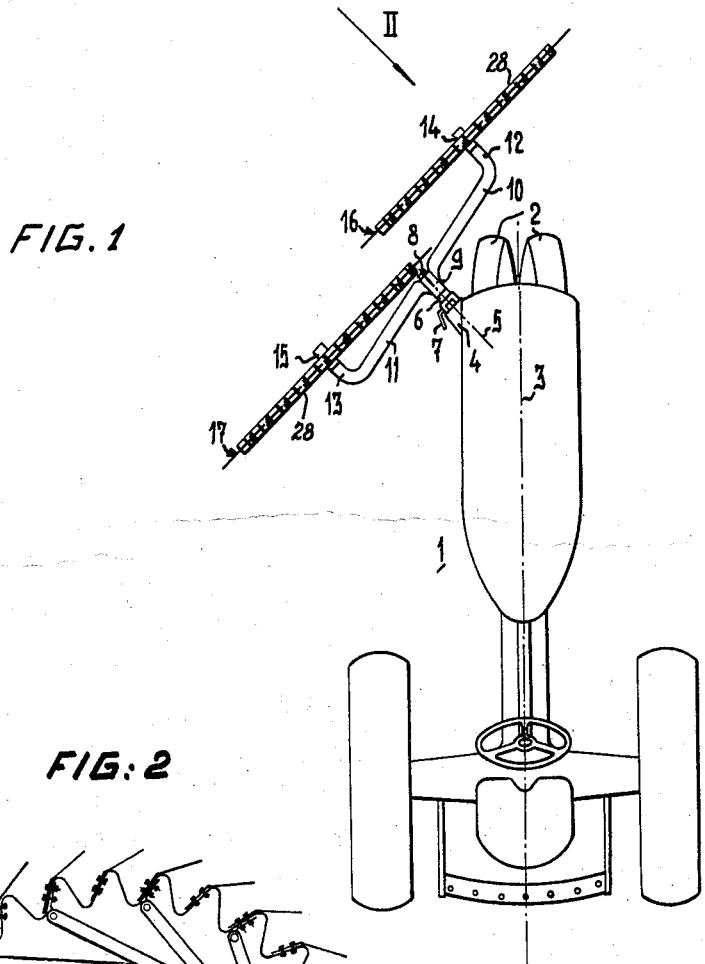
Figure 1 shows a plan view of a raking device according to the instant embodiment.

Referring to Figure 1 of the drawings, a tractor 1, the steerable front wheels 2 of which are located very near the longitudinal axis 3, is provided with a support 4 rigidly connected to the frame of the tractor and carrying a supporting member 6. The supporting member 6 is adjustable in height and may be locked by means of a locking member 7, it being understood that any suitable means for vertically adjusting the supporting member 6 on the frame may be employed. Said supporting member 6 has its center line 5 directed forwardly to the left, as shown, and carrying an axle 8 in the same direction. Axle 8 is surrounded by a bushing 9 which is mounted to be rotatable but immovable longitudinally on axle 8. The bushing 9 is provided with two arms 10 and 11 extending in opposite directions and having their extremities 12 and 13 bent forward in the direction of center line 5. Upon the extremities 12 and 13, hubs 14 and 15, respectively, of the rake wheels 16 and 17, respectively are freely rotatable. For the purpose of the claims, the bushing 9 together with arms 10 and 11 and extremities 12 and 13 comprise the "frame" or "frame structure" for the rake wheels 16 and 17.

Figure 2:
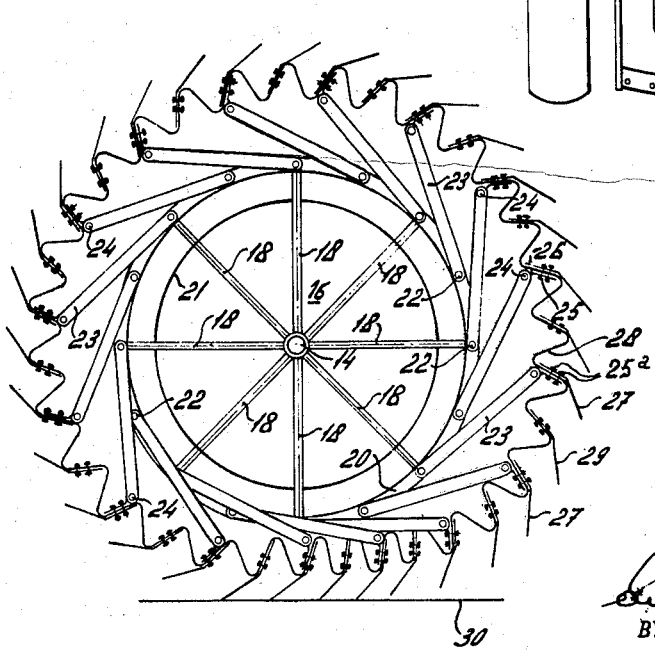
Figure 2 shows one of the raking members of said device on a larger scale, viewed in the direction of the arrow II in Figure 1.

The construction of rake wheels 16 and 17 appears from Figure 2 which refers in particular to rake wheel 16.

The hub 14 of the rake wheel 16 is connected by spokes 18 to rim 20. In the rim 20 a plurality of pins 22 are rotatably mounted. A thin concentric ring 21 is fixed to the spokes 18 within the rim 20. The bearings for pins 22 are uniformly distributed along the circumference of the rim. Each pin 22 carries a connecting member in the shape of a flat arm 23 fixedly connected to a pin 24. The center lines of all pins 22 and 24 are always parallel to the center line of the hub 14. It will be appreciated that ring 21 may not extend beyond rim 20 so as to impede inward motion of arms 23.

Each arm 23 diverges laterally somewhat from its inner to its outer end. In other words, the outer end of each arm 23 is such a distance from the plane of the rim 20 that the outer end can move past the inner end of an adjacent arm, as shown in the lower part of Figure 2. Each pin 24 is hingedly mounted in a bushing 26 provided with a short outwardly extending strip 25. Bushings 26, being located behind arms 23 in Figure 2, are not clearly shown, but it will be understood that any suitable bushings or equivalent may be employed. At points 25a the strips 25 are riveted to toothlike catching means 27 on a supporting member in the shape of an endless band 28 of flat spring steel which is undulated in its plane. Between every two catching means or teeth 27 two undulations of the band are located. Between every two teeth 27 still another catch means or tooth 29 has been riveted upon the band 28.

As appears in the lower part of Figure 2, the elastic band 28 will deform itself upon bearing the raking member upon the ground in such manner that correponding points of the undulated band are located substantially at the same height above the ground over an appreciable distance. Consequently, a large number of the teeth, which are supposed to be rather stiff, will simultaneously come into contact with the ground and the raking member will thus present a large working width.

In operation, the rakable material which is delivered to the left by rake wheel 16 (Figure 1) by said rake wheel being rotated by contact with the ground or the rakable substance thereon, is further displaced laterally together with other material, if any, by rake wheel 17 which is constructed in the same manner as rake wheel 16.

The rake wheels 16 and 17 balance about axle 8 and consequently rest with a relatively small pressure upon the ground. The forces occurring due to unevennesses of the terrain are thus distributed over both rake wheels and only half of said forces will act upon each wheel.

The above description and drawing disclose a single embodiment of the invention, and specific language has been employed is describing the figures. It will, nevertheless, be understood that no limitations of the scope of the invention are thereby contemplated, and that various alterations and modifications may be made as would occur to one skilled in the art to which the invention relates.

We claim:

1. A raking member comprising a hub rotatable about an axis, a rim member spaced outwardly from said hub and substantially concentric therewith, connecting means connecting said hub and said rim member, arms pivotably connected at one end to said rim member and extending outwardly therefrom, an endless undulated resilient band spaced outwardly from said rim member, said arms being connected at their end opposite from said rim to said band, and a plurality of outwardly extending individual teeth mounted on said band.

2. A raking member according to 1 wherein said connecting means connecting said hub and said rim member are spokes.

3. A raking member according to 1 wherein said arms are hingedly connected to said rim means on one end and to said band on the other.

4. A raking member according to 1 wherein said arms extend outwardly from said rim member in a direction substantially tangentially from said rim member.

5. A raking member comprising a hub rotatable about an axis, a rim member spaced outwardly from said hub and substantially concentric therewith, a plurality of spokes rigidly connecting said hub and said rim member, a plurality of arms hingedly connected at one end to said rim member each extending substantially tangentially therefrom, an endless resilient band spaced outwardly from said rim member, each of said arms being hingedly connected at its other end to said band, and a plurality of raking teeth attached to said band and extending outwardly therefrom.

6. A push-type rake attachment for laterally displacing grass, hay or other material lying on the ground comprising a frame structure and at least two rake wheels rotatably mounted in overlapping relationship on said frame structure, said rake wheels being mounted on projections rigid with said frame structure, said rake wheels each having a hub and a central portion concentric to their hub with flexible means outward of and around said central portion and connected thereto incorporating a plurality of raking teeth.

7. A device according to 6 having axle means connected to said frame structure and support means for said frame structure connected to a tractor, said axle means interconnecting said frame structure and said support means thereby providing support for said frame, and said frame being rotatable about the longitudinal axis of said axle means.

8. A device for laterally displacing grass, hay or other material lying on the ground comprising a frame, at least two rake wheels rotatably mounted in overlapping relationship on said frame, at least two projections extending from said frame and rigid therewith for mounting said rake wheels, the longitudinal axes of said projections being parallel, each of said rake wheels having a hub, a central portion concentric to its hub, a plurality of raking teeth spaced concentrically to said central portion and outwardly with respect thereto, and resilient supporting means for said raking teeth interposed between and interconnecting said central portion to said raking teeth.

9. A device according to 8 wherein said resilient supporting means consists of an endless undulating flat spring band connected to said central portion by a plurality of connecting arms each hingedly connected on one end to said central portion and on the other end to said band, said raking teeth being attached to said band.

10. A device for laterally displacing grass, hay or other material lying on the ground comprising a frame structure, at least two axles rigidly connected to said frame structure, rake wheels rotatably mounted on said axles, said rake wheels being rotated by their contact with the ground and having substantially parallel axes of rotation, axle means connected to said frame structure, and support means for said frame structure connected to a tractor, said axle means inter-connecting said frame structure and said support means thereby providing support for said frame and said frame being rotatable about the longitudinal axis of said axle means.

References Cited in the file of this patent

UNITED STATES PATENTS

| | | |
|---|---|---|
| 2,657,519 | Hill | Nov. 3, 1953 |
| 2,712,723 | Ryan | July 12, 1955 |

OTHER REFERENCES

Dept. of Agriculture Engineering, North Carolina Experiment Station Information Circular No. 4.